(12) United States Patent
Takami (10) Patent No.: US 6,525,724 B1
(45) Date of Patent: Feb. 25, 2003

(54) NAIL ORNAMENTING DEVICE (75) Inventor: Tomio Takami, Tokyo (JP)

(73) Assignee: Kabushiki Kaisha Atlus, Tokyo (JP)

(*) Notice: Subject to any disclaimer, the term of this patent is extended or adjusted under 35 U.S.C. 154(b) by 0 days.

(21) Appl. No.: 09/472,021

(22) Filed: Dec. 27, 1999

(30) Foreign Application Priority Data

Dec. 25, 1998 (JP) ............................................ 10-376517

(51) Int. Cl.[7] .............................................. G06T 17/00
(52) U.S. Cl. ....................................... 345/419; 345/418
(58) Field of Search ................................. 345/418, 419, 345/619

(56) References Cited

U.S. PATENT DOCUMENTS 6,035,860 A * 3/2000 Mombourquette .......... 132/200

* cited by examiner

Primary Examiner—Cliff N. Vo
(74) Attorney, Agent, or Firm—Finnegan, Henderson, Farabow, Garrett & Dunner, L.L.P.

(57) ABSTRACT

A nail ornamenting device of high originality is inexpensively provided by accurately grasping the contour and shape including even the unevenness of a nail portion, then obtaining three-dimensional data thereof, thus enabling clear printing of a desired pattern or the like on any nail, and enabling writing of a pattern or figure by a user himself/herself or printing of a pattern or the like brought by the user. In a nail ornamenting device, with respect to a nail portion having its contour recognized by contour recognition device and having its unevenness recognized by unevenness recognition device, the shape or the like is three-dimensionally analyzed and displayed by three-dimensional display device, and a selected pattern or a pattern written by the user using a coordinate input device is printed on the nail portion by print device after synthetic information obtained by the three-dimensional display device is confirmed.

18 Claims, 7 Drawing Sheets

NAIL ORNAMENTING DEVICE

BACKGROUND OF THE INVENTION

1. Field of the Invention

This invention relates to a nail ornamenting device for printing various patterns, characters or the like on a nail portion, which is utilized in the fields of cosmetology and fashion.

2. Description of the Related Art

Conventionally, nail ornamentation was a professional service provided at beauty salons, or some people used to simply enjoy drawing patterns or the like on their nail portions by themselves. Recently, however, an increasing number of young people care about the ornament on their nail portions, and in response to this, artificial nails and nail stickers having various patterns drawn thereon have been appearing on the market. Also, a device has recently been developed that is capable of selecting a desired pattern from a plurality of patterns stored in a storage medium and printing the selected pattern on a nail portion.

Since the ornamentation on the nail portions provided at beauty salons is time-consuming and costly, it could not be broadly accepted as an everyday fashion item. On the other hand, artificial nails and nail stickers are relatively inexpensive, but tend to obstruct washing or kitchen work and may easily fall off. In addition, since artificial nails and nail stickers are of limited patterns and figures that are printed in advance, they have a low degree of freedom in selection.

As for the recently developed device, only the patterns stored in the storage medium in advance can be printed, and it has a problem of less originality and a low degree of freedom in selection. Even if it is possible to measure and determine the contour of a nail portion and to directly print a pattern thereon using a special printer, the unevenness and three-dimensional shape of the nail portion are not measured. Therefore, while the pattern can be clearly printed around the center of the nail portion, the print on a lowered and curved portion near the periphery of the nail portion is blurred.

SUMMARY OF THE INVENTION

Thus, it is an object of the present invention to inexpensively and safely provide a nail ornamenting device with improved pattern originality and freedom of pattern choice, that can be readily used by everyone, by accurately grasping the contour and uneven shape of a nail portion, then obtaining three-dimensional data thereof and adjusting printing accordingly, thus enabling clear printing of a desired pattern or the like on any nail portion, and enabling additional writing of patterns and figures by a user himself/herself.

According to a preferred embodiment of the present invention, there is provided a nail ornamenting device comprising: print means for printing a pattern or the like on a nail portion of a finger; contour recognition means for recognizing the contour of the nail portion; unevenness recognition means for recognizing the unevenness of the nail portion; and three-dimensional display means for three-dimensionally displaying the recognized contour and shape of the nail portion.

The nail ornamenting device further comprises data input means to enable a user to select and write a pattern or the like by himself/herself.

The nail ornamenting device further comprises print supply means for printing out various image data such as image data of a pattern or the like, a combination of a pattern or the like and a nail portion, and a nail portion having a pattern or the like printed thereon.

Moreover, the nail ornamenting device of the present invention further comprises operation means for actuating the device by a coin or a token.

Also, the contour recognition means includes shooting means for obtaining information of the nail portion, and arithmetic means for digitizing the light and darkness of the shot contour of the nail portion.

Furthermore, the unevenness recognition means includes non-contact measuring means for identifying the unevenness without contacting the nail portion, and arithmetic means for digitizing the identified unevenness.

Also, the three-dimensional display means includes arithmetic means for forming a surface model of the contour and shape of the nail portion and forming a three-dimensional expression thereof, and display means for displaying an image of various information such as a three-dimensional image of the nail portion or a mapping image.

Moreover, a liquid crystal monitor having coordinate input means is used as the data input means.

A preferred embodiment of the present invention further comprises a groove or any other supporting tool for setting a finger thereon for printing on the nail.

Additional features and advantages of the invention will be set forth in the description which follows, and in part will be apparent from the description, or may be learned from practice of the invention. The objectives and other advantages of the invention will be realized and attained by the apparatus particularly pointed out in the written description and claims herein as well as the appended drawings.

DETAILED DESCRIPTION

The accompanying drawings, which are incorporated into and constitute part of the specification, illustrate a presently preferred embodiment of the invention and together with the general description given above and detailed description of the preferred embodiment given below, serve to explain the principles of the invention.

Figure 1:
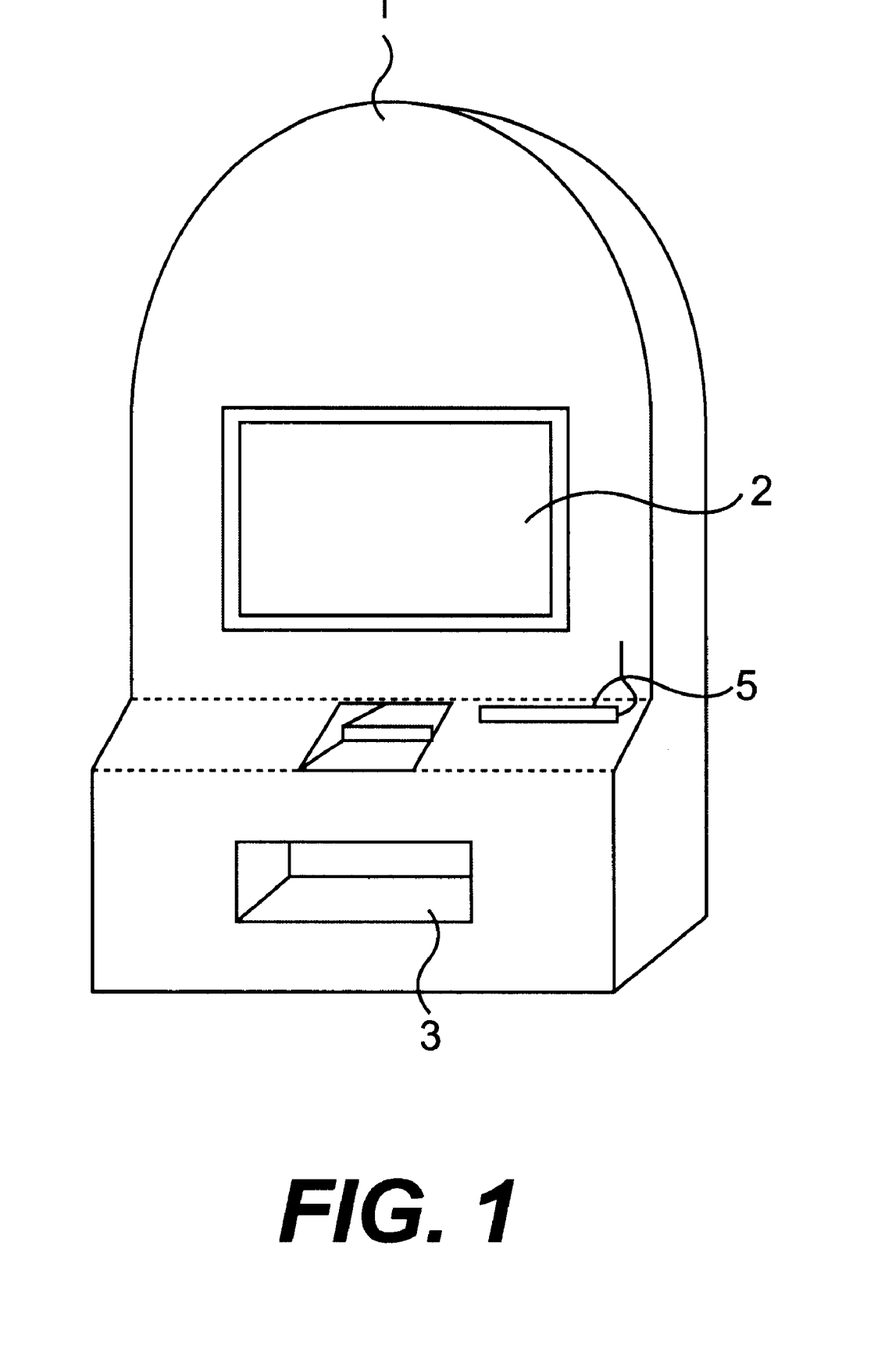
FIG. 1 is a schematic perspective view of a first embodiment of a nail ornamenting device according to the present invention.
Figure 2:
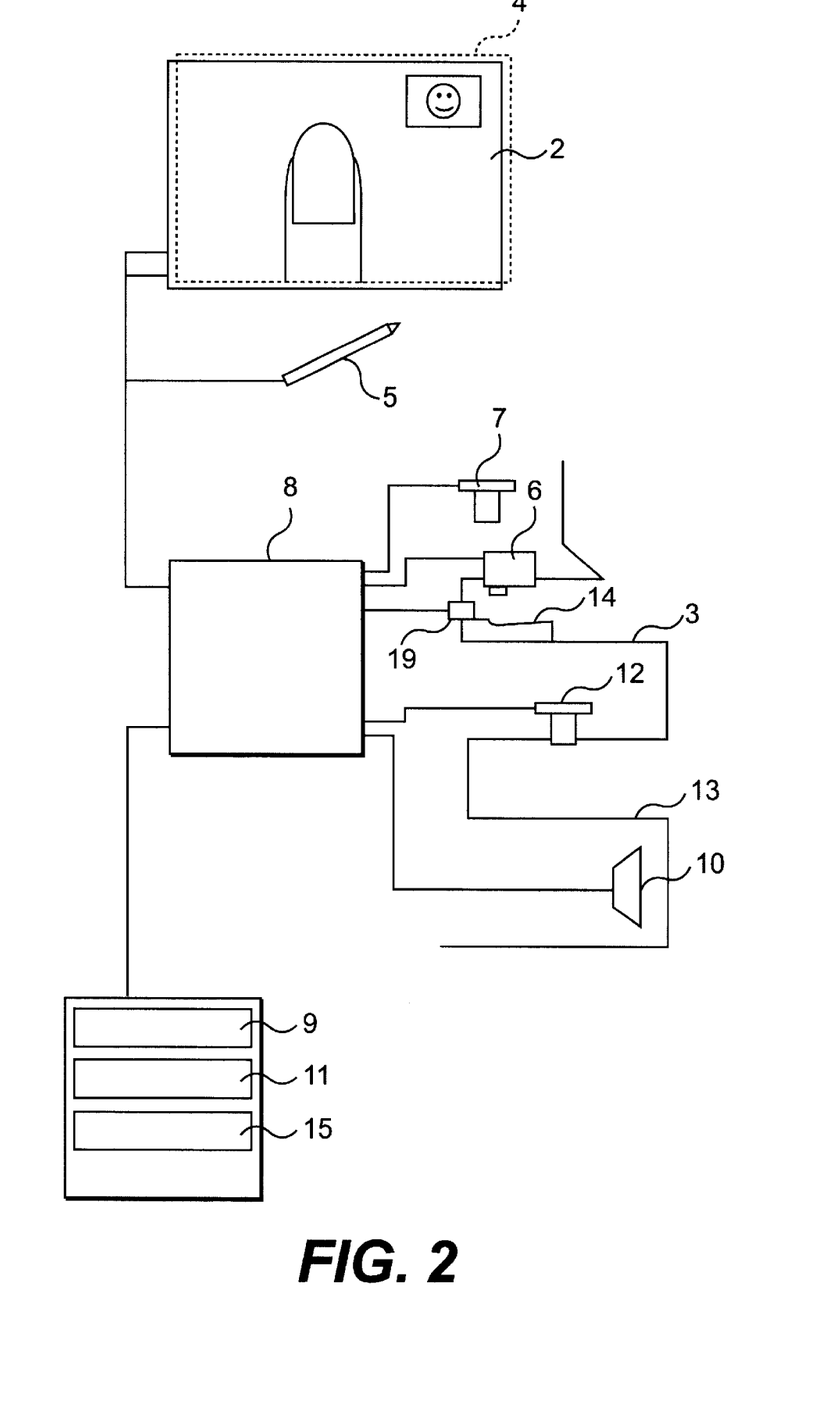
FIG. 2 is a schematic systematic view showing the correlation of constituent elements of a first embodiment of the nail ornamenting device according to the present invention.

Preferred embodiments of a nail ornamenting device according to the present invention will now be described with reference to the drawings. FIG. 1 is a schematic perspective view showing the appearance of a preferred embodiment of the nail ornamenting device according to the present invention, and FIG. 2 is a schematic systematic view showing the correlation of constituent elements of a preferred embodiment of the nail ornamenting device according to the present invention. A preferred embodiment of the nail ornamenting device according to the present invention typically includes a body 1, on which a monitor 2 as display means and an insertion port 3 for inserting a finger or wrist are present, as shown in FIG. 1.

According to the preferred embodiment of the present invention providing data input means enabling a user to create a pattern by himself/herself a coordinate input device 4 visually recognized as being integrated with the monitor 2, and an input pen 5 are present, as shown in FIG. 2. In the case where various instructions are given by using the input pen 5, the monitor 2 including the coordinate input device 4 and the input pen 5 are present regardless of whether the user can write a pattern or not.

Figure 3:
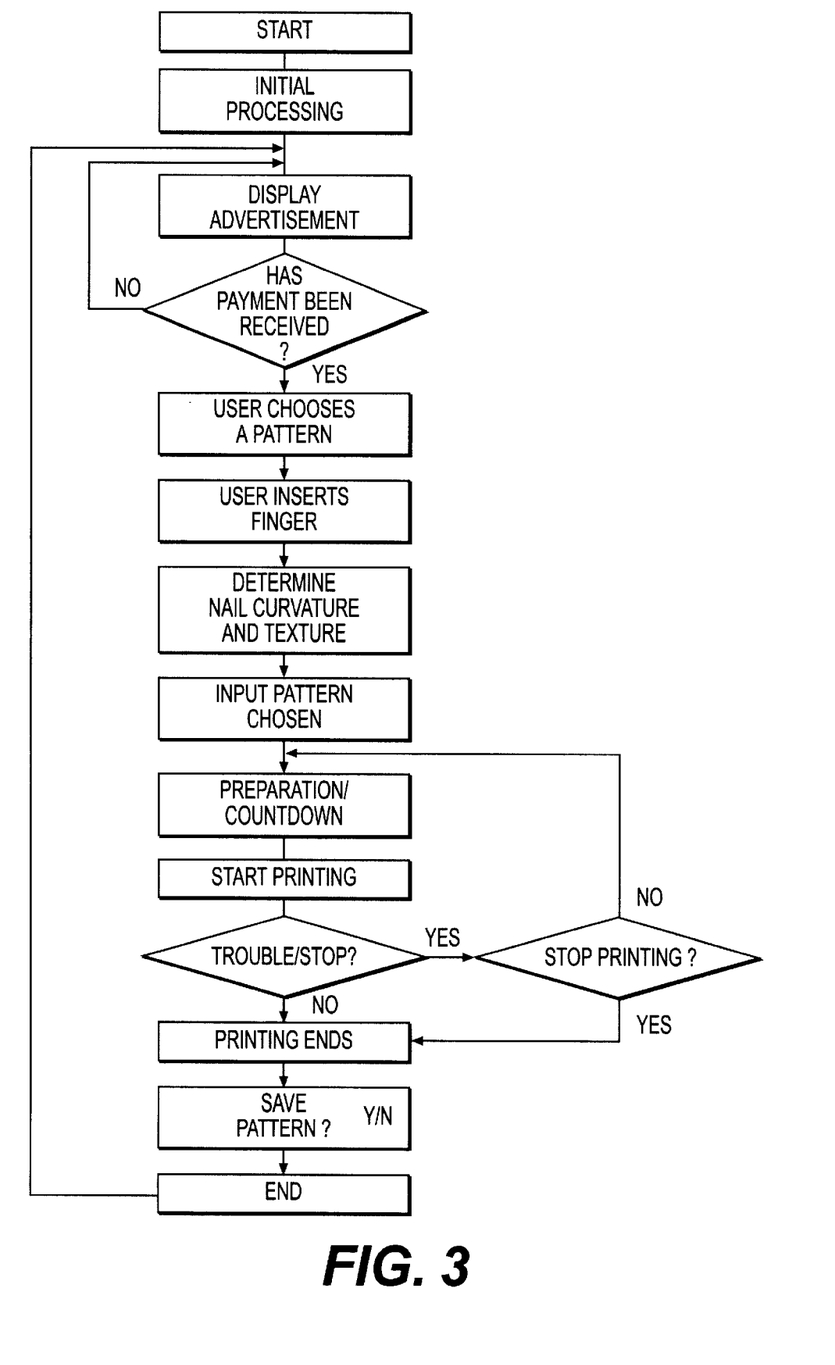
FIG. 3 is a flowchart of the procedures for carrying out print work using the first embodiment of the nail ornamenting device according to the present invention.

Inside the insertion port 3, a groove 14 or any other supporting tool for stably supporting a finger for printing on the nail portion is provided. The other supporting tool includes various types of tools such as a tool for being abutted against a certain portion of a finger and thus restraining the movement thereof, or a tool for holding a finger inserted therein.

Figure 6A:
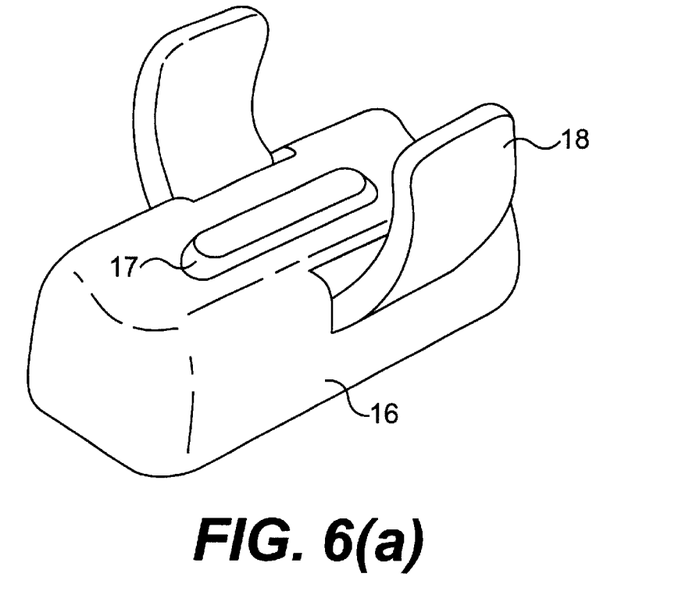
FIG. 6(a) is a schematic perspective view of a nail holder in a preferred embodiment of the nail ornamenting device according to the present invention.
Figure 6B:
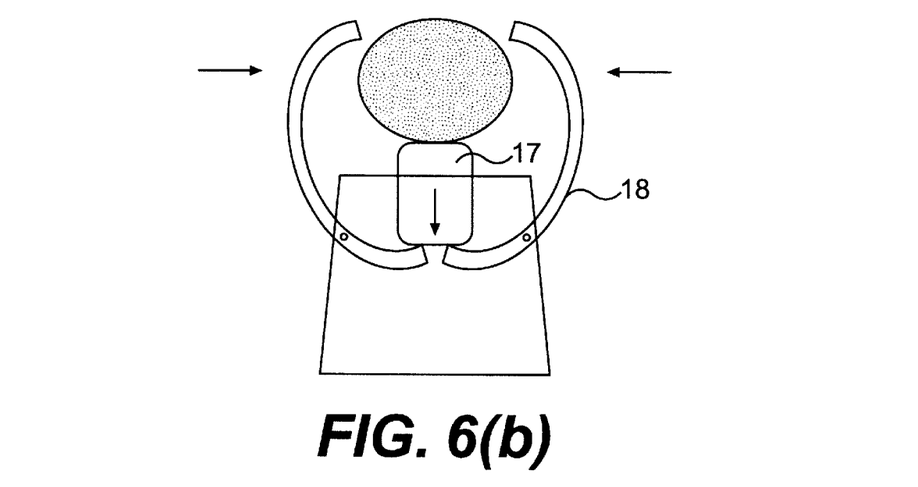
FIG. 6(b) is a front cross-sectional view of the nail holder.
Figure 6C:
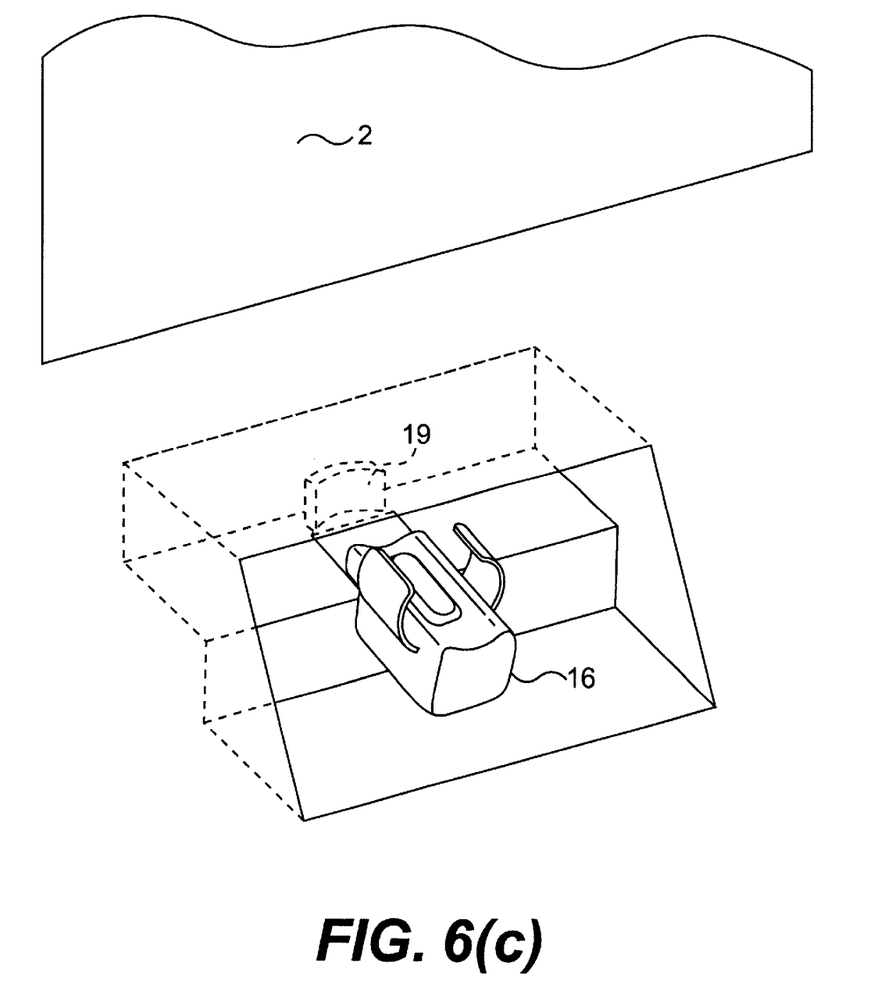
FIG. 6(c) is a schematic perspective view wherein the nail holder and a stopper are incorporated into the preferred embodiment of the nail ornamenting device according to the present invention.

With respect to this feature, it is planned to provide a holder 16 for automatically locking a part of the finger as the finger is set thereon, as shown in FIGS. 6(a) to 6(c), in addition to or in place of the groove 14 or supporting tool.

In the embodiment shown in FIG. 2, since a pattern or the like brought by the user is to be printed on the nail, a stage 13 used for obtaining the data of the pattern through a shooting machine 12 is present. In the case where image data of the user himself/herself is to be used, such a stage is not provided.

In the preferred embodiment of the present invention, print supply means for printing out various image data is provided, an ejection port (not shown) from which an image print is ejected is visually recognized. Also in the present invention, operation means for actuating the device by a coin or the like is provided, an entry port (not shown) is visually recognized.

The internal structure of the nail ornamenting device according to a preferred embodiment of the present invention will now be described as follows. The nail ornamenting device typically includes a camera or other imaging device 7 for obtaining information about the nail portion, another camera or imaging device 12 for obtaining pattern data, a PC board 8 for digitizing the contour and unevenness of the nail portion, a monitor 2 for displaying various information in the form of image, and a printer 6 for printing a pattern or the like on the nail portion, as shown in FIG. 2. The present invention also contemplates a speaker 10 for outputting appropriate background music or speech at the time of actuating the device and a lighting unit 9 for illuminating the nail portion in printing are provided.

In the present invention, the monitor 2 (including one having the coordinate input device 4), the printer 6, the camera 7, the shooting machine 12 and the lighting unit 9 are respectively connected to the PC board 8. The ON/OFF operation of each of the constituent elements is carried out by pointing to the coordinate input device 4 using the input pen 5, and arithmetic processing of the information of the nail portion obtained through the camera 7 and display of the image data thereof are carried out correspondingly.

In the present invention, the print supply means for printing out various image data is provided and in the present invention, the operation means for actuating the device by a coin or the like is provided, the print supply means 16, which is a second printer, and an accounting device 11 as the operation means are also connected, to the PC board 8.

The procedures for printing a pattern or the like on the nail portion using the nail ornamenting device according to the present invention will now be described with reference to FIGS. 2 and 3. First, as the power is turned on to start the start-up system, initial setting processing is carried out on the PC board 8 and advertisement display is carried out on the monitor 2.

Then, using the input pen 5, a desired work is designated on the coordinate input device 4 integrally provided with the monitor 2. When a credit is established, a pattern or the like to be selected and determined is displayed on the monitor 2. In the case where the operation means for actuating the device by a coin or the like is provided, the device is actuated by entering a coin or the like necessary for actuation into the entry port (not shown), and a pattern or the like is displayed on the monitor 2 when a credit is established.

Then, the user's fingers or wrist are inserted into the insertion port 3, and a finger on which printing is to be carried out is set in the groove 14 provided inside, thus determining an optimum print position for stable printing. In the embodiment shown in FIG. 2, the groove 14 is used as the means for supporting a finger. However, various other types of means can be considered such as means for abutting a portion of a finger and restraining the movement thereof or a ring for holding a finger inserted therein. Alternatively, a plurality of finger shapes corresponding to the sex and age of users may be provided and constituted as an attachment system. In the embodiment where the groove 14 is provided, normally, a height is provided such that the distal end of a finger abuts the bottom of the insertion port 3, and only a desired finger is inserted with the other fingers bent.

In addition to or in place of the groove 14 or supporting tool, the holder 16 as shown in FIG. 6(a) may be provided. In the case of FIG. 6(a), when a finger on which printing is to be carried out is set on an operating section 17, it moves downward as shown in FIG. 6(b) to pressurize the lower parts of wing-like supporting members 18 partially engaged with the body of the holder 16. Thus, the upper parts of the supporting members 18 move in the directions indicated by arrows to narrow the spacing, thereby stably holding the finger which is stretched. In the case where this holder 16 is used, normally, the finger is held from its first joint to its second joint.

Moreover, a preferred embodiment of the present invention contemplates enabling manual sliding of the entire holder 16 forward and backward, as shown in FIG. 6(c). In such a case, a sensor for sensing the slide of the finger to a home position is provided on a stopper 19 against which the distal end of the finger or nail is abutted. Thus, in response to the operation of the sensor, it is possible for the computer inside the PC board 8 to determine that the printing by the printer 6 can be continued while the distal end of the finger or nail is in contact with the stopper 19 and that the printing should be stopped or in the standby state when the finger or nail is moved away.

Thus, when the finger is held at the optimum position for enabling the printing on the nail, information of the nail portion is captured by the camera or imaging means 7. After the information of the nail portion including the measured contour and unevenness is digitized by the arithmetic means on the PC board 8, various information related to the nail portion and a pattern or the like is displayed in the form of image on the monitor 2. In the case where the data input means for allowing free writing of a pattern or the like is provided, the user, using the input pen 5, can write a desired pattern or the like on the coordinate input device 4 integrally provided with the monitor 2. In this case, the user can take his/her finger out of the insertion port 3 once, then carry out necessary writing, and then reset the finger. The holding of the finger is canceled on completion of the printing.

In the case where a pattern or the like selected by the user is to be printed on the nail portion, the image of the pattern set on the stage 13 is captured by the camera or imaging device 12, and the image information is displayed in the form of image on the monitor 2 via the PC board 8.

As the means for recognizing the contour of the nail portion, the lightness and darkness of the information of the nail portion imaged by the camera or imaging device 7 is identified. The unevenness of the nail portion is identified by non-contact measuring means. The non-contact measuring means includes one or more of a spot light projection method, a slit light projection method, a step light projection method, a spatial code pattern light projection method and the like. One of these methods is selected in accordance with the size and shape of the body 1, the cost and other considerations.

Figure 4A:
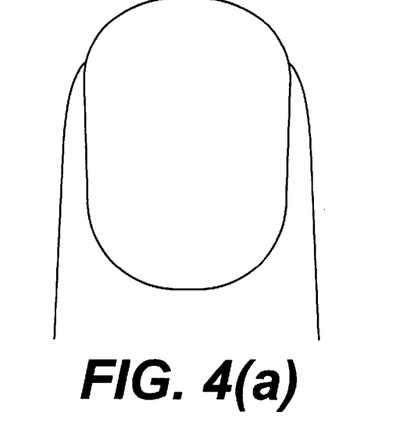
FIG. 4(a) is a plan view of a nail portion of a person.
Figure 4B:
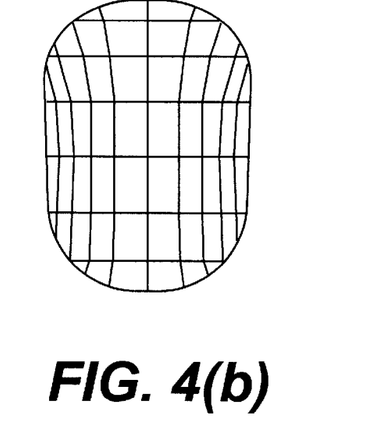
FIG. 4(b) is a pattern view of a surface model of the nail portion of FIG. 4(a).
Figure 4C:
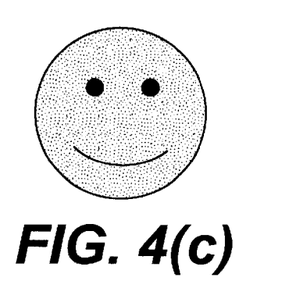
FIG. 4(c) is a plan view of a pattern to be printed on the nail portion of FIG. 4(a).
Figure 4D:
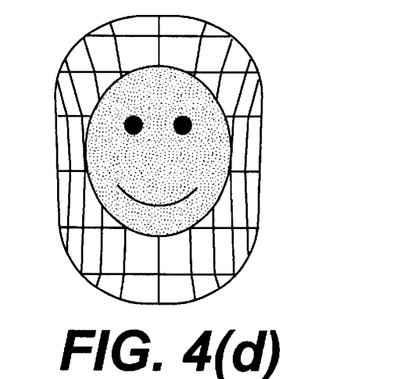
FIG. 4(d) is a three-dimensional view of the pattern of FIG. 4(c) mapped on the nail portion of FIG. 4(b).

The digitized information of the nail portion is displayed as an image of a surface model of the nail portion as shown in FIG. 4(b) or as a three-dimensional image showing a desired pattern of FIG. 4(c) mapped on the nail portion as shown in FIG. 4(d). Therefore, the print position of the desired pattern or the like on the nail portion can be adjusted and a simulation image can be checked in before the pattern is applied to the nail.

Figure 5A:
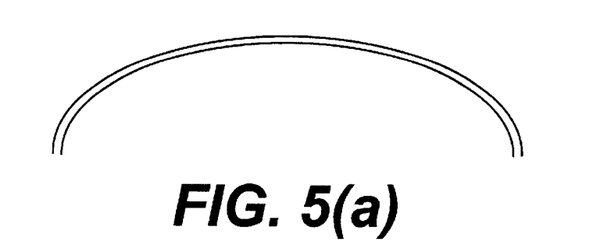
FIG. 5(a) is a lateral cross-sectional view of a nail portion of a person.

The printer 6 for carrying out printing on the nail portion is preferably an ink jet printer, but may alternatively be any suitable device for transferring the pattern to the nail portion. When printing onto a plane such as an ordinary sheet of paper, movement of the printer head and ejection of color ink from the ink jet nozzle are actuated under the control of the computer so as to draw a pattern or the like (i.e., ejecting the ink from right above the sheet) perfectly following the stored data. However, the actual nail portion has a curved cross section as shown in FIG. 5(a). Therefore, when printing onto the nail portion under the print control similar to that for a planar sheet of paper, the print on a lowered and curved portion near the periphery of the nail portion is blurred even though the pattern may be clearly printed around the center of the nail portion. Thus, in the present invention, correction for the non-planar shape of the nail portion is made as follows.

Figure 5B:
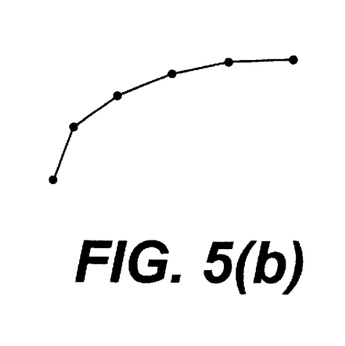
FIG. 5(b) is a polygonal view of the cross-sectional curve of FIG. 5(a) by equidistant broken lines.
Figure 5C:
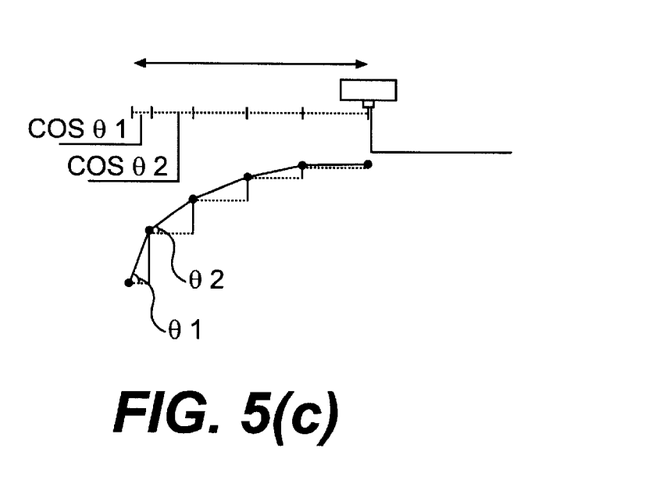
FIG. 5(c) is a schematic view of the correlation of the polygonal view and a printer head.

From the lateral cross section of the nail portion shown in FIG. 5(a), it is found that the left and right parts thereof are lowered and curved. In forming a surface model of the shape of the nail portion, the cross section of the nail, which is actually curved, is recognized as polygonal broken lines as shown in FIG. 5(b). The nail portion is grasped and held after the surface model is formed. Thus, when the printer head moves along this cross section and ejects the color ink from above, the angle of ejection of the color ink is adjusted stepwise in accordance with the inclination (angle $\theta 1$, $\theta 2$, . . . ) of each broken line, as shown in FIG. 5(c).

Specifically, in the case as shown in FIG. 5(b), if the length of each broken line is 1, the quantity of ink ejected onto the cross section having the length of 1 from the printer head and ink jet nozzle laterally moving at a constant velocity is concentrated to the length $\cos \theta 1$, $\cos \theta 2$, . . . , as viewed from above the broken line, and the blur of the pattern or the like can be thus corrected. In short, the correction can be numerically controlled by the computer.

With the color ink of the ordinary ink jet printer, rubbing the pattern printed on the nail causes blur of the ink, and the printing must be carried out with a dedicated color ink having a certain viscosity. Also, in order to maintain the pattern or the like printed on the nail for a long period of time, a base coat must be applied to the nail before printing the chosen pattern and a top coat must be applied to the nail after printing. The base coat covers the unevenness of the nail surface thereby achieving a smoother nail surface, thus protecting the nail from fixation of dyestuff and improving the settlement of the ink. The top coat provides luster and resiliency for the color ink and protects the nail from any external shock.

Thus, on completion of the selection of the pattern or the like, an instruction as to whether to print or not is entered by using the input pen 5, and if print is instructed, the printing to the nail portion is started after a countdown or lapse of time. Preferably, if there is a problem with the device of the present invention after the start of the printing, the device automatically stops or can be manually stopped. The device can then be restarted when the problem no longer exists to continue printing. If the user does not like the selected or written pattern or the like, or if any trouble is generated after the start of the printing and the printing is interrupted, the print instruction can be entered repeatedly.

Figure 4E:
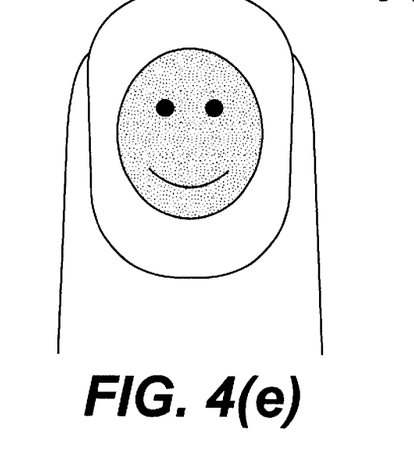
FIG. 4(e) shows the completion of printing of the pattern of FIG. 4(c) on the nail portion of FIG. 4(a).

Preferably on completion of printing the pattern onto the nail portion, the user decides whether to register and save the selected or written pattern. In the case where printing is carried out by using the nail ornamenting device according to the present invention, it is understood that though the color at the left and right end parts looks dark as shown in FIG. 4(e), the color is uniformly printed as viewed along the actual nail surface. In the case where a printing mechanism is provided, various data can be printed out such as the selected pattern, a combination of the pattern and the nail portion, or image data of the nail portion on which the pattern is printed, and the instruction therefor can be given during each work process.

The above-described embodiment of the invention is directed to the automatic nail ornamenting device in which the printer, the monitor, and the PC board are mounted on the device body 1. However, as another embodiment, a manually operated nail ornamenting device may also be used which is connected to a separately installed personal computer, preferably including a monitor, a keyboard and a printer.

With the nail ornamenting device according to the present invention, since the unevenness of the nail portion as well as the contour thereof is measured, a pattern or the like can be uniformly printed even on a lowered and curved portion of the nail portion.

Also, in the present invention where the data input means is provided, since a pattern or figure written by the user himself/herself can be printed, the originality and the degree of freedom in selection can be significantly improved in comparison with the conventional device, which enables only the selection from patterns stored in the storage medium.

Moreover, in aft embodiment of the present invention that includes a mechanism for printing out various image data, images such as a selected pattern, an image of a combination of the selected pattern and the nail portion, or an image of the pattern printed on the nail portion can be printed, referred to, and shown, to other people.

Furthermore, in the present invention, since the contour and shape of the nail portion can be put in a surface model or a three-dimensional expression, which can be mapped or three-dimensionally displayed, the print position can be adjusted more in detail and the status of the nail portion after printing can be simulated more realistically.

In addition, in the present invention, since the ornamentation on the nail portion can be automatically carried out, the nail ornamentation, which was-time-consuming at beauty salons or the like, can be more time-saving and can be provided at a lower cost. As a result, the nail ornamentation can be readily enjoyed by everyone.

Also, since a preferred embodiment of the present invention includes a holder for holding the finger at the optimum position for printing, the printing to the nail portion can be stably carried out.

Japanese Patent Application No. 10-376517, filed Dec. 25, 1998, is incorporated herein by reference in its entirety.

It will be apparent to those skilled in the art that various modifications and variations can be made in the nail ornamenting device of the present invention without departing from the scope and spirit of the invention.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A nail ornamenting device comprising:
   print means for printing a pattern on a nail portion of a finger;
   contour recognition means for recognizing the contour of the nail portion;
   unevenness recognition means for recognizing the unevenness of the nail portion; and
   three-dimensional display means for, three-dimensionally displaying the recognized contour and shape of the nail portion.

2. The nail ornamenting device of claim 1, further comprising data input means to enable the operator to create the pattern.

3. The nail ornamenting device of claim 1, further comprising print supply means for printing image data.

4. The nail ornamenting device of claim 1, further comprising operation means for actuating the device by one of a coin and a token.

5. The nail ornamenting device of claim 1, wherein the contour recognition means includes an imaging device for obtaining information about the nail portion, and arithmetic means for digitizing the light and darkness of the contour of the nail portion.

6. The nail ornamenting device of claim 1, wherein the unevenness recognition means includes non-contact measuring means for identifying the unevenness without contacting the nail portion, and arithmetic means for digitizing the identified unevenness.

7. The nail ornamenting device of claim 1, wherein the three-dimensional display means includes arithmetic means for forming a surface model of the contour and shape of the nail portion and forming a three-dimensional expression thereof, and display means for displaying an image.

8. The nail ornamenting device of claim 2, wherein the data input means is a liquid crystal monitor having coordinate input means.

9. The nail ornamenting device of claim 1, further comprising one of a supporting tool for setting a finger thereon for printing on the nail and a holder for locking a part of the finger.

10. The nail ornamenting device of claim 1, further comprising detection means in the groove or supporting tool or on the periphery thereof for detecting the setting of a finger at a predetermined position so that the print means is actuated by the detection of the finger by the detection means.

11. The nail ornamenting device of claim 1, further comprising an imaging device for obtaining one of a pattern created by a user and an image of the user himself.

12. A nail ornamenting device comprising:
   an input device enabling a user to select a pattern for printing on a nail;
   a printer for printing the pattern on a nail portion;
   an imaging device and a digitizer for recognizing the contour and unevenness of the nail portion onto which the pattern will be printed; and
   a display device for displaying a three-dimensional image of the nail portion.

13. The nail ornamenting device of claim 12, wherein the input device includes an input pen and the display device includes an interactive touch display capable of interacting with the input pen.

14. The nail ornamenting device of claim 12, wherein the printer is a laser jet printer.

15. The nail ornamenting device of claim 12, further comprising an imaging device for capturing a pattern created by the user for printing the pattern on the nail.

16. The nail ornamenting device of claim 12, further comprising an imaging device for capturing an image of a person or object of printing the image of the person or object on the nail.

17. The nail ornamenting device of claim 3, wherein the image data comprises at least one of a selected pattern, a combination of a selected pattern and a nail portion, and a nail portion having a selected pattern printed thereon.

18. The nail ornamenting device of claim 7, wherein the image comprises at least one of a three-dimensional image of the nail portion and a mapping image.

* * * * *